United States Patent [19]

Brolin

[11] 4,371,755
[45] Feb. 1, 1983

[54] BRIDGE LIFTER CIRCUIT

[75] Inventor: Stephen J. Brolin, Livingston, N.J.

[73] Assignee: Bell Telephone Laboratories, Incorporated, Murray Hill, N.J.

[21] Appl. No.: 223,904

[22] Filed: Jan. 9, 1981

[51] Int. Cl.³ .......................................... H04M 13/00
[52] U.S. Cl. .................................. 179/35; 179/2.51; 179/17 B
[58] Field of Search ........ 179/34, 35, 51 AA, 18 FH, 179/17 A, 17 E, 17 R, 18 FA, 17 B, 2.51

[56] References Cited

U.S. PATENT DOCUMENTS

| | | | |
|---|---|---|---|
| 3,073,908 | 1/1963 | Hochgraf et al. | 179/35 |
| 3,189,689 | 6/1965 | Hochgraf | 179/35 |
| 3,673,330 | 6/1972 | Suntop et al. | 179/2.51 |
| 3,703,610 | 11/1972 | Ebbe et al. | 179/35 |
| 3,881,068 | 4/1975 | Jones, Jr. et al. | 179/35 |
| 4,310,723 | 1/1982 | Svala | 179/17 E |

FOREIGN PATENT DOCUMENTS 1078795  8/1967  United Kingdom ............. 179/17 B

Primary Examiner—Gerald L. Brigance
Attorney, Agent, or Firm—R. O. Nimtz

[57] ABSTRACT

The tip and ring leads (15,17) of a tip party transmission facility are reversed before connecting the separate channel units for the tip and ring party channels to bridge lifters (16,18) at the central office, thus permitting selective ringing. Tip party identification for billing is provided by a tip-party indicator (20) inserted in the tip party transmission path at the central office by grounding the tip conductor when needed. The need for rewiring the tip party telephone set is then eliminated by providing separate single party channel units.

7 Claims, 2 Drawing Figures

BRIDGE LIFTER CIRCUIT

BACKGROUND OF THE INVENTION

1. Field of the Invention

This invention relates to subscriber loop systems and, more particularly, to a bridge lifter circuit with tip party indication for use in such systems.

2. Description of the Prior Art

Where two-party telephone service is used with subscriber loop carrier systems, the two parties, known as the tip party and the ring party, are often required to share a common channel from the central office terminal (COT) to the remote terminal (RT) of the subscriber loop carrier system, thus necessitating at least two different types of channel units at the carrier terminals: one type for single-party service and another, more expensive type, for two-party service.

Furthermore, in some applications, bridge lifters are located either at the RT or at a field location between the RT and the telephones. Bridge lifters are used to isolate idle loops bridged on the line so as to prevent undesirable loading on the active loop and thereby cause unacceptable transmission loss. Remotely located bridge lifters create special administrative problems because, on the one hand, use of subscriber loop carrier systems require a group of subscribes to be closely located to the RT; on the other hand, two subscribers sharing a party line should be geographically separated to insure privacy in telecommunications.

Additionally, the telephones of at least one of the parties must be rewired to permit identification for selective ringing and billing purposes. When the two-party service is upgraded to single-party service, the telephones must be rewired. Thus, the administrative activity attendant with the provision of two-party service in conjunction with the use of subscriber loop carrier systems creates an economic burden which should be alleviated to make the service viable.

SUMMARY OF THE INVENTION

In accordance with the illustrative embodiment of the present invention, the tip party's tip and ring leads from the tip party's COT carrier channel unit are reversed before bridging the bridge lifters of the tip and ring parties to a shared line at the central office. The tip party is separably identified from the ring party for billing purposes by the detection of longitudinal loop current in the tip party loop in response to a test signal from the central office.

Because the parties are each identified at the central office, each party can be assigned a separate subscriber loop carrier channel, making possible the use of standard and less expensive single-party channel units. Furthermore, standard telephone sets wired for single-party service may be used. Thus, by the use of standard equipment the operational and administrative cost of providing two-party service is considerably reduced.

DETAILED DESCRIPTION

Figure 1:
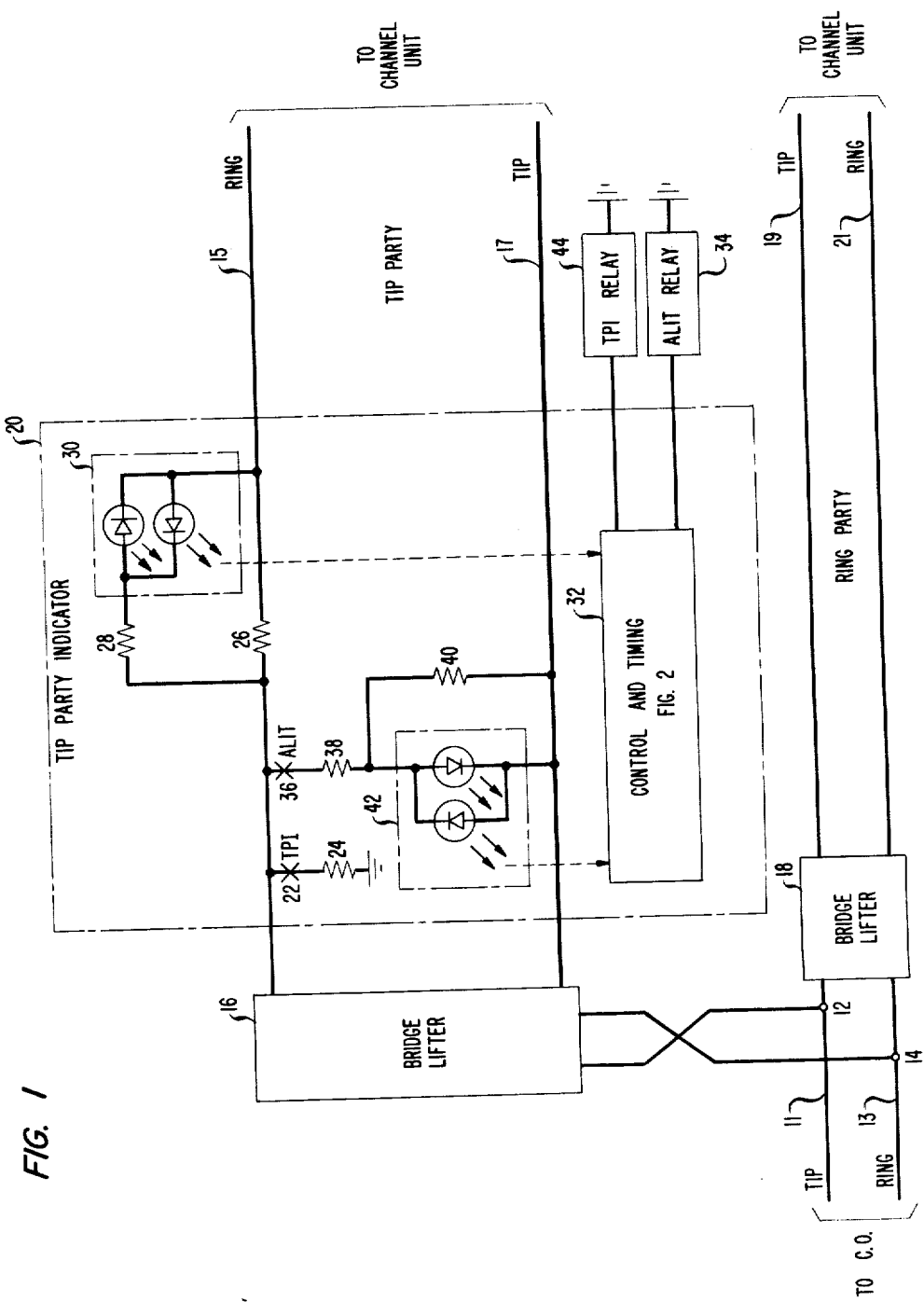
FIG. 1 is a circuit diagram of a bridge lifter with a tip party indicator circuit.

Referring to FIG. 1, there is shown a bridge lifter and tip party indicator circuit embodying the present invention. Tip conductor 11 and ring conductor 13 of a shared line connect the central office equipment (not shown) with terminals 12 and 14, respectively. Bridge lifters 16 and 18 connect the tip party leads 15,17 from the tip party carrier channel unit (not shown) and the ring party leads 19,21 from the ring party carrier channel unit (not shown) with the terminals 12,14, respectively. Whereas the leads from bridge lifter 16 are shown reversed before their connection to terminals 12,14, it is equally possible for leads 15,17 to be reversed before their connection to bridge lifter 16 to achieve the same results which will be described hereinbelow. By providing a high series impedance in the loop not in service, bridge lifters 16,18 ensure that only one of the two parties have access to line conductors 11,13 of the shared line and to a switching path through the central office at any given time. That is, the use of bridge lifters 16 and 18 insures that only one of the two parties get service at any one time.

Bridge lifters may be made of saturable core reactors or of electronic components, known as miniature bridge lifters. Saturable core reactor bridge lifters are disclosed in U.S. Pat. No. 2,924,667 granted Feb. 9, 1960 to L. Hochgraf. Miniature bridge lifters are disclosed in U.S. Pat. No. 4,166,931 granted Sept. 4, 1979 to W. F. MacPherson et al and U.S. Pat. No. 3,881,068 granted Apr. 29, 1975 to C. E. Jones et al.

When single-party service is provided in conjunction with subscriber loop carrier systems, ringing signals to alert a called subscriber's telephone are detected at the COT channel unit by a ringing detector connected between the ring conductor and ground. The ringing signals are than encoded and relayed to the RT channel unit for decoding and applying a remote ringing signal to the telephone ringers connected across tip and ring conductors of the loop. Likewise, test signals from a test center are detected by a test detector connected between the tip conductor and ground at the COT channel unit. Such methods of ringing and test detection are disclosed in U.S. Patent Application, entitled "Variable Rate Timing Circuit", by G. K. Francis, Ser. No. 209,886, filed Nov. 24, 1980 and assigned to the same assignee as the application herewith.

When the tip party is to be alerted that a call is waiting, ringing signals are applied from the central office on the tip conductor 11. Because tip conductor 11 is connected through ring lead 15 of the tip party to the tip party carrier channel unit, the ringing signals will be detected by a ringing detector connected between ring lead 15 and ground at the carrier channel unit, as disclosed in the Francis application mentioned hereinabove. However, the tip conductor 11 is connected to the ring party's tip lead 19. Because the ringing detector is connected between ring lead 21 and ground at the ring party carrier channel unit, ringing signals applied to the tip conductor 11 will not energize the ring party's ringing detector. On the other hand, when ringing signals are applied to the ring conductor 13, the ringing detector connected to the ring lead 21 of the ring party will respond to alert the ring party's telephones and the tip party's telephone will not be alerted. Thus, selective ringing of the telephones of either party is achieved.

It will be noted that tip and ring parties are assigned separate carrier channels in the subscriber loop carrier systems. Because party selection for ringing is achieved at the central office, as described hereinabove, standard telephone sets wired for single party service can be used.

For calls originated by the remote telephone sets, it is also necessary to distinguish between the tip party and the ring party. Referring to FIG. 1, there is shown a tip party indicator 20 connected between the bridge lifter 16 and the tip party leads 15,17. The tip party indicator 20 aids in the identification of the tip party by detecting when the tip party is off-hook and, immediately thereafter, by detecting when the central office battery is disconnected. In response thereto, tip party indicator (TPI) relay contacts 22 are operated to connect a resistor 24 between ring lead 15 and ground. Because the ring lead 15 of the tip party is connected with the tip conductor 11, the grounded connection to ring lead 15 will appear as a grounded connection to the tip conductor 11 appearance at the central office equipment, thereby properly identifying the tip party. The ring party is identified by detecting the absence of such a tip lead path to ground.

More particularly, when the tip party goes off-hook, loop current flows through resistors 26,28 and the pair of bidirectional light emitting diodes (LEDs) 30. If this loop current flows for about 25 milliseconds, as indicated by the transmission of light from the LEDs 30 to the control and timing circuit 32, the circuit is considered to be active. Thereafter, automatic line insulation test (ALIT) relay 34 is operated to close ALIT contacts 36, which are normally open when the tip party loop is inactive. The presence of central office metallic voltage causes current to flow through resistors 38,40 and the pair of light emitting diodes (LEDs) 4. Light from the LEDs 42 is transmitted to the control and timing circuit 32.

When the tip party is to be identified (that is, when the central office wishes to test the tip party for billing purposes), as indicated by the disconnection of the central office battery, light from the LEDs 42 will cease to be transmitted to the control and timing circuit 32. In response thereto, and provided loop current continues to flow in the tip party loop immediately prior to the test, TPI relay 44 will be operated to close TPI contacts 22 thereby connecting grounded resistor 24 to the ring lead 15. The central office detects the flow of current from tip lead 11 to ground (the normal tip party response to the test) and thereby identifies the active party as the tip party. After the tip party test has been performed, the central office battery is reconnected with the loop, causing light to be transmitted once again from the LEDs 42 to the control and timing circuit 32. In response thereto, the TPI relay 44 will be released to open contacts 22 thereby removing the ground connection from ring lead 15.

Switchhook flashes, dial pulsing breaks, and on-hook signals from the tip party are detected by the cessation of loop current in the tip party loop as indicated by the absence of light from LEDs 30 and the simultaneous presence of light from the LEDs 42 for about 15 milliseconds. If loop current is not restored in about 2 seconds, it is assumed the circuit has returned to the idle state.

Figure 2:
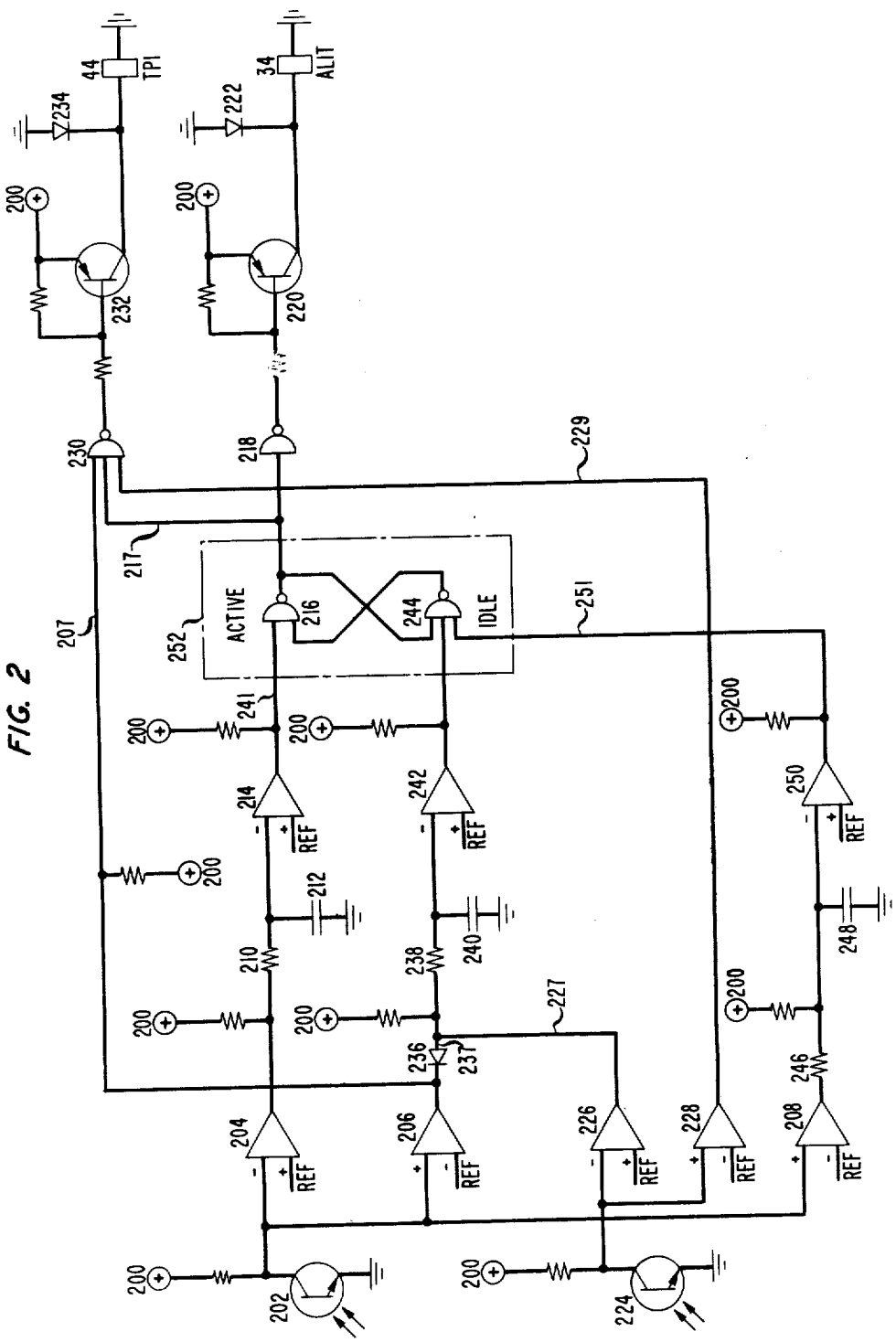
FIG. 2 is a detailed control and timing circuit shown in the tip party indicator circuit of FIG. 1.

Referring to FIG. 2, there is shown the detail of the control and timing circuit 32 shown in FIG. 1. LEDs 30 in FIG. 1 and transistor 202 together form an opto-isolator. When the tip party loop is active, loop current flows through the LEDs 30 thereby turning on the transistor 202. The collector electrode of transistor 202 is connected to comparators 204, 206 and 208. The output lead from comparator 204 is connected to a slow charging timer set for 25 milliseconds, with a fast discharge, comprising resistor 210 and capacitor 212. When the tip party loop remains active for about 25 milliseconds, capacitor 212 becomes sufficiently changed to cause comparator 214 to change the state on its output lead 241. The change in state of lead 241 sets the bistable latch 252 comprising NAND gates 216 and 244. When the bistable latch 252 is set, NAND gate 218 is switched, thereby enabling the supply of base electrode current to turn on the transistor 220 and operate ALIT relay 34. Diode 222 performs a flyback function protecting transistor 220 from inductive surge voltages from ALIT relay 34. ALIT relay 34 closes the contacts 36 shown in FIG. 1 and enables the transmission of light from the LEDs 42 to the control and timing circuit 32.

When light from the LEDs 42 is transmitted to the control and timing circuit 32, thereby providing the base current to turn on the transistor 224, the signal from the collector electrode of transistor 224 is transmitted to the comparators 226 and 228. When the tip party is to be identified, central office battery is disconnected from the loop, thereby stopping the transmission of light from the LEDs 42 and turning off the transistor 224. The output from comparator 228 is transmitted to NAND gate 230 by lead 229. Simultaneously, the output from NAND gate 216 and the output from comparator 206 are transmitted to the NAND gate 230 over leads 217 and 207, respectively. The input to NAND gate 230 on lead 217 indicates that the tip party loop is active; the input on lead 207 is provided to ensure fidelity in operation, and may be omitted without making the circuit inoperational. Thus, when the tip party is to be identified, as indicated by a change in state of lead 229, the output lead from NAND bgate 230 changes state, thereby enabling transistor 232 to operate the TPI relay 44. Diode 234 protects the transistor 232 from surge voltages from TPI relay 44. Operation of TPI relay 44 causes the TPI contacts 22 of FIG. 1 to close and the connection of the grounded resistor 24 to the ring lead 15.

After the completion of the tip party identification, the central office battery is reconnected with the loop and light is transmitted once more from LEDs 42 to turn on the transistor 224. Thus, the state on the output lead 229 from comparator 228 is changed; that is, the state on the input lead 229 to the NAND gate 230 is changed. The output from the NAND gate 230 then disables the transistor 232 and releases TPI relay 44. When TPI relay 44 is released, TPI contacts 22 in FIG. 1 is opened and ground is removed from ring lead 15.

Dial pulsing break intervals, switchhook flashes, and on-hook signals are indicated by the presence of two events for a timed interval of about 15 milliseconds: first, the central office battery must be connected to the loop, as indicated by the transmission of light from the LEDs 42; and second, there must be an absence of loop current in the tip party loop, as indicated by the cessation of light from the LEDs 30.

The first event is indicated by the turning on of transistor 224 whose collector electrode is connected to comparator 226. The second event is indicated by the turning off of transistor 202 whose collector electrode is connected to comparator 206. The comparators 226 and 206 are connected to a timing circuit set for 15 milliseconds, comprising resistor 238 and capacitor 240. Diode 236 blocks the output of comparator 226 from affecting the state of the output of comparator 206 transmitted on lead 207 to the NAND gate 230 as described hereinabove.

After a timed period of about 15 milliseconds, the output from the timer (the voltage on capacitor 240) causes the comparator 242 to change the state transmitted to the NAND gate 244. That is, the latch 252 is reset. Thus, the output from the NAND gate 244 changes state causing the output signals from NAND gates 216 and 218 to change states thereby turning off the transistor 220 and releasing the ALIT relay 34.

Release of the ALIT relay 34 opens the ALIT contacts 36, thereby removing the high resistance 38 from across the tip party leads 15,17. That is, when the tip party is idle, the bridged resistor 38 is disconnected so that the central office-initiated line insulation test for the tip party loop will not be foiled. When the tip party loop returns to the active state, the ALIT contacts 36 is closed once more as described hereinabove.

Finally, when the tip party returns to the idle state, as indicated by the cessation of loop current through the LEDs 30 and the absence of light transmitted therefrom, transistor 202 is turned off thereby causing the output of comparator 208 to start a timer comprising resistor 246 and capacitor 248. After 2 seconds, the comparator 250 is enabled, thereby changing the state on lead 251 to NAND gate 244. Thereafter the circuit operates to open the ALIT contacts 36, as described hereinabove, returning the tip party indicator circuit to the idle state. Thus, it is insured that latch 252 will be reset, that is, returned to the idle state, under a variety of trouble conditions.

What is claimed is:

1. A two-party telephone circuit for subscriber loop carrier systems comprising
   a shared pair of conductors (11,13),
   a pair of ring party conductors (19,21),
   a pair of tip party conductors (15,17),
   a first bridge lifter circuit (18) connecting said shared pair of conductors (11,13) directly to said pair of ring party conductors (19,21),
   a second bridge lifter circuit (16) connecting inverted shared pair of conductors to said pair of tip party conductors (15,17),
   automatic number identification circuit means (20) connected to said tip party conductors (15,17), and single-party channel means in said subscriber loop carrier system connected to each said ring party and said tip party conductors.

2. A bridge lifter circuit comprising a tip party loop (15,17), a tip party indicator (20) and first (16) and second (18) bridge lifters, said tip party indicator,
   a first pair of light emitting diodes (30) connected in series with the ring conductor (15) of said tip party loop for transmitting light in response to the flow of current in said tip party loop to a control and timing circuit (32),
   a first relay (34), in response to signals from said control and timing circuit (32), for operating a first contact (36) for connecting first and second resistors (38,40) and a second pair of light emitting diodes (42) across the tip and ring conductors (15,17) of said tip party loop, and
   a second relay (44), in response to signals from said control and timing circuit (32), for operating a second contact (22) thereby connecting or removing a third resistor (24) between ground and said ring conductor (15) of said tip party loop for identifying said tip party loop.

3. A bridge lifter circuit comprising a set of ring party leads (19,21), a set of tip party leads (15,17), first (16) and second (18) bridge lifters, and first and second central office terminal channel units in a subscriber loop digital carrier system, said bridge lifter circuit
   said tip party leads (15,17) being reversed before being connected to said first bridge lifter (16), and
   said set of tip party leads (15,17) and said set of ring party leads (19,21) being connected to said first and second channel units, respectively.

4. The bridge lifter circuit according to claim 3 further,
   said bridge lifter circuit is located at the central office.

5. The bridge lifter circuit according to claim 3 further,
   said tip and ring parties are connected with standard telephones wired for single-party service.

6. The bridge lifter circuit according to claim 3 further,
   said first (16) and second (18) bridge lifters are made of saturable core reactors.

7. The bridge lifter circuit according to claim 3 further,
   said first (16) and second (18) bridge lifters are miniature bridge lifters.

* * * * *